United States Patent [19]

Kelly

[11] 4,200,303
[45] Apr. 29, 1980

[54] DOOR-OPERATED BOARDING STEP FOR TRUCKS

[76] Inventor: Patrick N. Kelly, P.O. Box 1251, Baker, Mont. 59313

[21] Appl. No.: 914,549

[22] Filed: Jun. 12, 1978

[51] Int. Cl.$^2$ .............................................. B60R 3/02
[52] U.S. Cl. ................................................... 280/166
[58] Field of Search ............... 280/166, 164 R, 164 A; 182/88

[56] References Cited

U.S. PATENT DOCUMENTS

| | | | |
|---|---|---|---|
| 2,583,894 | 1/1952 | Shuck | 280/164 A |
| 3,572,753 | 3/1971 | Claassen | 280/166 |
| 3,671,058 | 6/1972 | Kent | 280/166 |
| 3,751,068 | 8/1973 | Green | 280/166 |

*Primary Examiner*—Robert R. Song

*Attorney, Agent, or Firm*—Clarence A. O'Brien; Harvey B. Jacobson

[57] ABSTRACT

A door-operated boarding step for trucks, and the like, has a first step member and a second step member telescopingly attached to one another, with the first step member being mountable on a vehicle beneath a door of the vehicle so as to permit the second step member to be extended relative to the first step member on opening of the vehicle door by an operator connected to the second step member and the door for providing a step beneath the door which facilitates movements between a cab of the truck and the surface supporting the vehicle. Extension of the second step member is done against the bias of a spring connected to the first step member and second member, which spring is deflected sufficiently to retract the second step member relative to the first step member when the door is moved from an open mode to the normal, closed mode.

7 Claims, 3 Drawing Figures

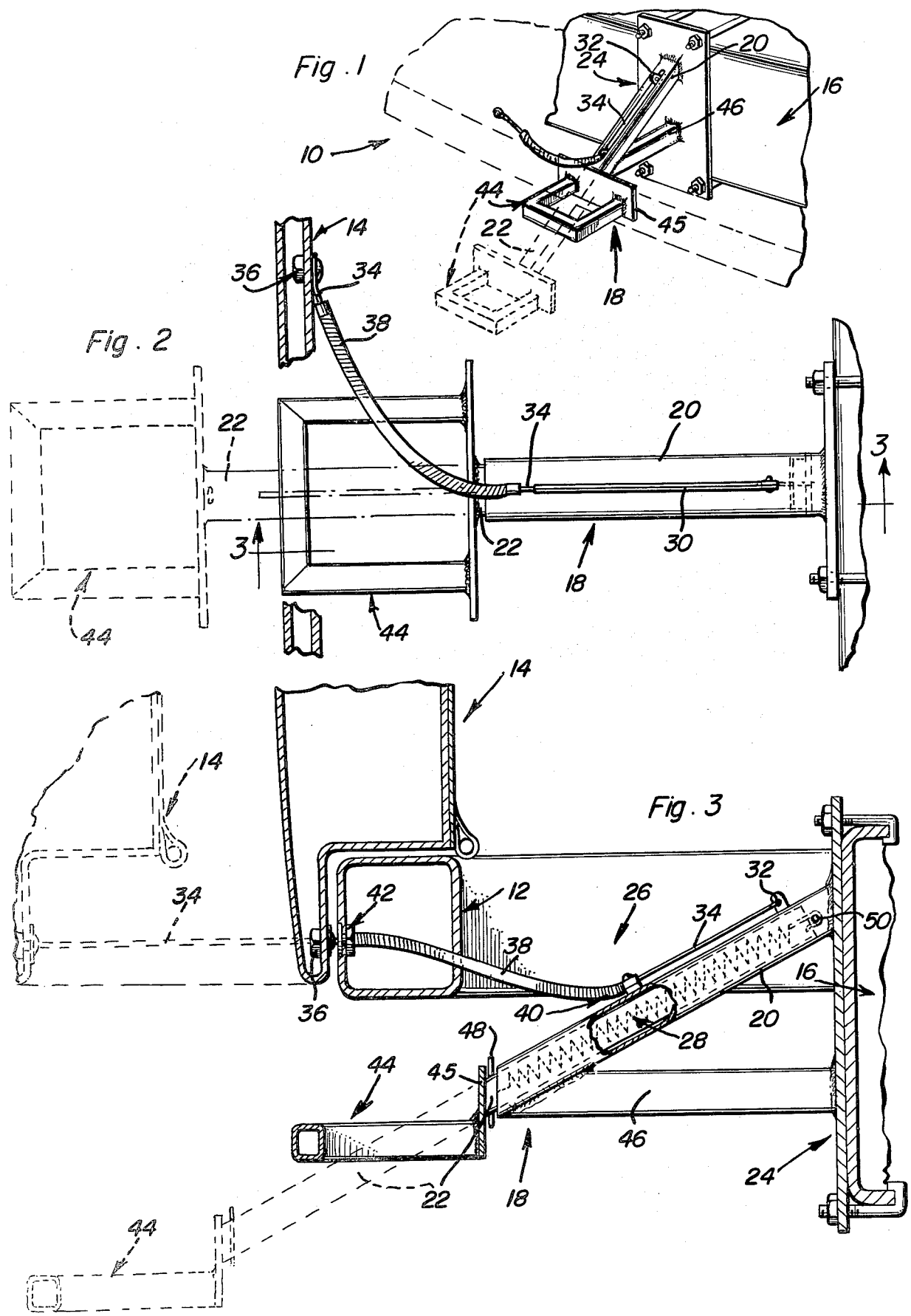

DOOR-OPERATED BOARDING STEP FOR TRUCKS

BACKGROUND OF THE INVENTION

1. Field of the Invention

This invention relates generally to boarding steps for vehicles, and]particularly to a retractable door-operated boarding step for a truck and similar motor vehicle.

2. Description of the Prior Art

A problem encountered with pickup trucks and similar vehicles is that the cabs thereof are so far off of the surface supporting the vehicle that it is difficult to board and unboard the vehicle. Accordingly, numerous boarding steps have been proposed for use with such vehicles, an example of which can be found in U.S. Pat. No. 3,751,068, issued Aug. 7, 1973, to H. C. R. Green. This patent discloses a step which is attached to a telescoping arm mounted beneath a vehicle. The telescoping arm is connected to the door of the vehicle by a cable, with the step being returned to its stored position once the door is returned to a closed mode by a spring located above the telescoping arm.

U.S. Pat. No. 3,817,554, issued June 18, 1974, to M. L. Cuffe, et al., discloses a vehicle step which normally rests horizontally beneath the frame of a truck or other vehicle, and which is depressed by stepping on the outer edge of the step. Thus, operation of the step is independent on the vehicle door. Further, U.S. Pat. No. 3,807,758, issued Apr. 30, 1974, to G. E. Rogge, discloses a boarding step which is mounted beneath a motor home. The step is linked to the door of the trailer by a crank arm for actuation upon opening of the door. Finally, U.S. Pat. No. 3,955,827, issued May 11, 1976, to J. J. Wonigar, discloses a stowable step for vehicles which is manually opened and closed in the manner of the step disclosed in U.S. Pat. No. 3,817,554 discussed above, while U.S. Pat. No. 3,572,753, issued Mar. 30, 1971, to E. H. Claassen, discloses a boarding step which is pivotally mounted beneath a truck or similar vehicle. The step is connected to a rotatable rod which is in turn connected to the door of the truck by a cable. When the door is opened, the step pivots out for use in entering the truck.

SUMMARY OF THE INVENTION

It is an object of the present invention to provide a boarding step which is readily mountable on high clearance vehicles for facilitating entry into the vehicles.

Another object of the present invention is to provide a vehicle boarding step which is automatically extended and retracted upon respective opening and closing of an associated vehicle door.

Yet another object of the present invention is to provide a vehicle boarding step of compact yet rugged and reliable construction readily adaptable to existing pickup trucks, and the like.

These and other objects are achieved according to the present invention by providing a door-operated boarding step having: a first step member and a second step member telescopingly attached to one another, the first step member being mountable on a vehicle beneath a door thereof; a mounting assembly for affixing the first step member to the vehicle; and an operator connected to the second step member and connectible to the door for extending the second step member from the first step member when the door is moved into an open mode.

The operator preferably includes a spring connected to the first step member and the second step member for retracting the second step member relative to the first step member when the door is in a closed mode.

The first step member advantageously is in the form of a hollow sleeve, and the second step member slidably disposed in the first step member. The spring preferably is a tension spring disposed within the first step member and anchored to the first step member and the second step member for biasing the latter into the former.

The first step member is provided with a slot extending longitudinally in a direction of extension and retraction of the second step member, with a protrusion slidably disposed in the slot and connected to the second step member. A cable connects the lug to the door of the vehicle for extending the second step member against the bias of the spring whenever the door is moved from a closed mode into an open mode.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a partly schematic, fragmentary, perspective view showing a door-operated boarding step according to the present invention mounted on the frame of a motor vehicle.

FIG. 2 is an enlarged, fragmentary, top plan view showing the boarding step and vehicle of FIG. 1.

FIG. 3 is a fragmentary, sectional view taken generally along the line 3—3 of FIG. 2.

DESCRIPTION OF THE PREFERRED EMBODIMENTS

Referring now more particularly to the figures of the drawing, a truck 10 or similar vehicle having a high entrance includes a door sill 12 above which is pivotally mounted a door 14 for selectively opening and closing a doorway entering a cab or other passenger compartment of truck 10. Disposed beneath the cab of truck 10 and forming part of the frame of the vehicle is a channel 16 on which is mounted a door-operated boarding step 18 according to the present invention.

Boarding step 18 includes a first step member 20 in the form of a hollow sleeve, and a second step member 22 which also may be in the form of a hollow sleeve and which is slidably disposed in step member 20. The latter is mountable on channel 16 as by the illustrated mount assembly 24 which comprises a plate and at least a pair of spaced J-bolts engageable with flanges of channel 16. Connected to step member 22 and to doors 14 for extending step member 22 relative to step member 20 when door 14 is moved to an open mode is an operator 26 to be described in detail below.

Operator 26 includes a coiled tension spring 28 disposed within step members 20 and 22 and anchored at either end to the respective step members 20, 22 for biasing same toward one another and retracting step member 22 relative to step member 20 when door 14 is moved into a closed mode blocking the entrance into the passenger compartment of truck 10, or other suitable vehicle.

Step member 20 is provided with a slot 30 extending longitudinally in a direction of extent and retraction of step member 22, with a protrusion 32 being slidably disposed in slot 30 and connected to the step member 22 and to door 14 by a cable 34 for extending step member 22 against the bias of spring 28 when door 14 is moved from a closed mode to an open mode. More specifically, cable 34 is secured to a lower portion of door 14 as by the illustrated fastener 36, and is disposed in a conduit 38 which extends from the upper, outer surface of the sleeve forming step member 20 to the outermost wall of door sill 12 of vehicle 10. A clamp 40 secures conduit 38 to step member 20, while a suitable fitting 42 anchors the other end of the longitudinally extending conduit 38 to door sill 12.

Step member 22 extends cantilever fashion from step member 20 and terminates in a generally rectangular footrest 44 in the form of an open framework defined on one side a generally planar plate 45 forming a base. The step member 20 is braced relative to the mount assembly 24 by a brace 46. Attachment of the base to the adjacent end of step member 22 can be effected as by welding, and the like, while the illustrated pins 48 and 50 disposed in opposed apertures provided in spaced ends of step members 22 and 20, respectively, anchor the ends of the spring 28.

As can be readily understood from the above description and from the drawings, a door-operated boarding step according to the present invention can be easily mounted on the frame of a vehicle by use of the J-bolt clamps associated with mount assembly 24. Once cable 34 is connected to a door 14 of the vehicle, which connection can be realized in a simple manner, the footrest 44 will be extended from beneath the vehicle whenever door 14 is swung outwardly to an open position. Simultaneously, spring 28 will be deflected so as to have sufficient force to retract footrest 44 whenever door 14 is moved back to a closed mode or position so as to release the cable 34 and permit protrusion 34 to slide upwardly in slot 30 toward the mount assembly 24. When retracted, the footrest, as well as the step members 20 and 22, are conveniently stored beneath the vehicle adjacent the frame thereof. Thus, automatic operation of the boarding step is realized in a simple and efficient, yet rugged and reliable manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A door operated boarding step for vehicles, comprising, in combination:
   (a) first and second step members, the second step member being slidingly supported from the first step member for extension and retraction thereto and including a foot engageable rest supported therefrom, the first step member being mountable on a vehicle beneath a door thereof; and
   (b) operator means connected to the second step member and connectible to the door of the vehicle for extending the second step means from the first step means when the door is in an open mode, said operator means including a spring connected to the first step member and to the second step member for biasing the second step member toward the first step member and retracting the second step member relative to the first step member when the door of the vehicle is in a closed mode, said first step member including a hollow sleeve, said second step member being slidably disposed in said sleeve, the spring being a tension spring disposed within said sleeve, and anchored to the first step member and the second step member for biasing the latter into the former.

2. A structure as defined in claim 1, wherein the first step member is provided with a slot extending longitudinally in a direction of extension and retraction of the second step member, a protrusion slidably disposed in the slot and connected to the second step member and to the door of the vehicle for extending the second step member against the bias of the spring when the door of the vehicle is moved from a closed mode to an open mode.

3. A structure as defined in claim 2, further including mounting means provided on the first step member for affixing the first step member to the vehicle.

4. In combination with a vehicle including a frame, a door sill, and a door pivotally mounted above the door sill, a door-operated boarding step disposed beneath the door sill, the boarding step comprising, in combination:
   (a) first and second step members, the second step member being slidably supported from the first step member for extension and retraction relative thereto and including a foot engageable rest supported therefrom, the first step member being mounted on the frame of the vehicle; and
   (b) operator means connected to the second step member and to the door for extending the second step member from the first step member when the door is in an open mode, the operator means including a spring connected to the first step member and to the second step member for biasing the second step member toward the first step member and retracting the second step member relative to the first step member when the door of the vehicles is in a closed mode, the first step member being in the form of a hollow sleeve, and the second step member being slidably disposed in the first step member, the spring comprising a tension spring disposed within the first step member, and anchored to the first step member and the second step member for biasing the latter into the former.

5. A structure as defined in claim 4, wherein the first step member is provided with a slot extending longitudinally in a direction of extension and retraction of the second step member, a protrusion slidably disposed in the slot and connected to the second step member and to the door of the vehicle for extending the second step member against the bias of the spring when the door of the vehicles is moved from a closed mode to an open mode.

6. A structure as defined in claim 5, further including mounting means provided on the first step member for affixing the first step member to the vehicle.

7. In combination with a vehicle including a high door sill and a frame member of said vehicle accessible from beneath the vehicle and spaced inwardly of said sill, a mount supported from said frame member and projecting toward said sill, said mount including an upstanding mounting plate for abutting against and rigid securement over the outer side of said frame member, a downwardly and outwardly inclined tubular sleeve having its upper end anchored relative to an upper portion of said plate, a horizontal brace member extending and connected between a lower portion of said plate and the lower end of said sleeve, an elongated inclined step member slidingly telescoped into and extendable downwardly from and retractable upwardly relative to the lower end of said tubular sleeve along a distinctly downwardly and outwardly inclined path relative to said plate and sill, said vehicle including a door shiftably supported therefrom for movement between open and closed positions relative to said sill, and operator means connected between said door and step member for automatically extending and retracting said step in response to opening and closing, respectively, of said door, said step, when in said retracted position, being positioned closely beneath said sill, said operator means including a spring connected between said sleeve and step member for biasing the latter toward its retracted position and an elongated flexible tension member connected between said door and step member for pulling said step member toward an extended position in response to movement to said door from its closed position toward its open position.

* * * * *